United States Patent
Park et al.

(10) Patent No.: US 7,698,833 B2
(45) Date of Patent: Apr. 20, 2010

(54) APPARATUS FOR HARDENING A SEALANT LOCATED BETWEEN A PAIR BONDED SUBSTRATES OF LIQUID CRYSTAL DISPLAY DEVICE

(75) Inventors: Moo Yeol Park, Taegu-kwangyokshi (KR); Sung Su Jung, Taegu-kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 843 days.

(21) Appl. No.: 10/244,668

(22) Filed: Sep. 17, 2002

(65) Prior Publication Data

US 2003/0172544 A1    Sep. 18, 2003

(30) Foreign Application Priority Data

Mar. 15, 2002  (KR) ............... 10-2002-0014130
Mar. 19, 2002  (KR) ............... 10-2002-0014789

(51) Int. Cl.
*F26B 25/00*    (2006.01)

(52) U.S. Cl. ............... 34/218; 34/239; 34/240

(58) Field of Classification Search ............ 34/218, 34/237, 239, 240; 206/279, 298; 220/592.02, 220/652; 217/7, 13, 7.13
See application file for complete search history.

(56) References Cited

U.S. PATENT DOCUMENTS

| | | | |
|---|---|---|---|
| 3,362,081 A * | 1/1968 | Bogenberger | 34/467 |
| 3,978,580 A | 9/1976 | Leupp et al. | |
| 4,094,058 A | 6/1978 | Yasutake et al. | |
| 4,120,085 A * | 10/1978 | Peterson | 29/600 |
| 4,303,286 A * | 12/1981 | McClellan | 312/409 |
| 4,540,222 A * | 9/1985 | Burrell | 312/257.1 |
| 4,653,864 A | 3/1987 | Baron | |
| 4,691,995 A | 9/1987 | Yamazaki | |
| 4,775,225 A | 10/1988 | Tsuboyama | |
| 4,862,602 A * | 9/1989 | Krill | 34/239 |
| 5,085,608 A * | 2/1992 | Turner | 446/75 |
| 5,247,377 A | 9/1993 | Omeis | |
| 5,263,888 A | 11/1993 | Ishihara | |
| 5,379,139 A | 1/1995 | Sato | |
| 5,406,989 A | 4/1995 | Abe | |
| 5,499,128 A | 3/1996 | Hasegawa | |
| 5,507,323 A | 4/1996 | Abe | |
| 5,511,591 A | 4/1996 | Abe | |
| 5,539,545 A | 7/1996 | Shimizu | |
| 5,548,429 A | 8/1996 | Tsujita | |
| 5,642,214 A | 6/1997 | Ishii | |
| 5,680,189 A | 10/1997 | Shimizu | |
| 5,742,370 A | 4/1998 | Kim | |
| 5,757,451 A | 5/1998 | Miyazaki | |

(Continued)

FOREIGN PATENT DOCUMENTS

EP    1 003 066 A1    5/2000

(Continued)

*Primary Examiner*—Jiping Lu
(74) *Attorney, Agent, or Firm*—McKenna Long & Aldridge LLP

(57) ABSTRACT

An apparatus for hardening a sealant on a substrate is disclosed in the present invention. The apparatus includes a chamber receiving at least a pair of bonded substrates, and at least one supporting unit supporting the bonded substrates, attached to inner side surfaces of the chamber, and having a substantially flat contact surface contacting the bonded substrates.

9 Claims, 6 Drawing Sheets

U.S. PATENT DOCUMENTS

| | | | |
|---|---|---|---|
| 5,852,484 A | 12/1998 | Inoue |
| 5,854,664 A | 12/1998 | Inoue |
| 5,861,932 A | 1/1999 | Inata |
| 5,875,922 A | 3/1999 | Chastine |
| 5,952,676 A | 9/1999 | Sato |
| 5,956,112 A | 9/1999 | Fujimori |
| 6,001,203 A | 12/1999 | Yamada |
| 6,011,609 A | 1/2000 | Kato |
| 6,016,178 A | 1/2000 | Kataoka |
| 6,016,181 A | 1/2000 | Shimada |
| 6,055,035 A | 4/2000 | Von Gutfeld |
| 6,098,529 A * | 8/2000 | Brummett et al. ............. 99/467 |
| 6,163,357 A | 12/2000 | Nakamura |
| 6,219,126 B1 | 4/2001 | Von Gutfeld |
| 6,226,067 B1 | 5/2001 | Nishiguchi |
| 6,231,205 B1 * | 5/2001 | Slesinger et al. ............ 362/133 |
| 6,236,445 B1 | 5/2001 | Foschaar |
| 6,304,306 B1 | 10/2001 | Shiomi |
| 6,304,311 B1 | 10/2001 | Egami |
| 6,337,730 B1 | 1/2002 | Ozaki |
| 6,414,733 B1 | 7/2002 | Ishikawa |
| 2001/0038002 A1 | 11/2001 | Kano et al. |

FOREIGN PATENT DOCUMENTS

| | | |
|---|---|---|
| JP | 51-65656 | 6/1976 |
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054228 | 3/1987 |
| JP | S62-054229 | 3/1987 |
| JP | S62-154225 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | 05-127179 | 2/1993 |
| JP | H05-036425 | 2/1993 |
| JP | H05-036426 | 2/1993 |
| JP | H05-107533 | 4/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 7-5405 | 1/1995 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-104564 | 4/1998 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2000-346550 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |

| | | | | | |
|---|---|---|---|---|---|
| JP | 2001-147437 | 5/2001 | JP | 2002-139734 | 5/2002 |
| JP | 2001-154211 | 6/2001 | JP | 2002-156518 | 5/2002 |
| JP | 2001-166272 | 6/2001 | JP | 2002-169166 | 6/2002 |
| JP | 2001-166310 | 6/2001 | JP | 2002-169167 | 6/2002 |
| JP | 2001-183683 | 7/2001 | JP | 2002-182222 | 6/2002 |
| JP | 2001-201750 | 7/2001 | JP | 2002-202512 | 7/2002 |
| JP | 2001-209052 | 8/2001 | JP | 2002-202514 | 7/2002 |
| JP | 2001-209056 | 8/2001 | JP | 2002-214626 | 7/2002 |
| JP | 2001-209057 | 8/2001 | JP | 2002-229042 | 8/2002 |
| JP | 2001-209058 | 8/2001 | JP | 2002-236276 | 8/2002 |
| JP | 2001-209060 | 8/2001 | JP | 2002-258299 | 8/2002 |
| JP | 2001-215459 | 8/2001 | JP | 2002-236292 | 9/2002 |
| JP | 2001-222017 | 8/2001 | JP | 2002-277865 | 9/2002 |
| JP | 2001-235758 | 8/2001 | JP | 2002-277866 | 9/2002 |
| JP | 2001-255542 | 9/2001 | JP | 2002-277881 | 9/2002 |
| JP | 2001-264782 | 9/2001 | JP | 2002-287156 | 10/2002 |
| JP | 2001-272640 | 10/2001 | JP | 2002-296605 | 10/2002 |
| JP | 2001-281675 | 10/2001 | JP | 2002-311438 | 10/2002 |
| JP | 2001-281678 | 10/2001 | JP | 2002-311440 | 10/2002 |
| JP | 2001-282126 | 10/2001 | JP | 2002-311442 | 10/2002 |
| JP | 2001-305563 | 10/2001 | JP | 2002-323687 | 11/2002 |
| JP | 2001-330837 | 11/2001 | JP | 2002-323694 | 11/2002 |
| JP | 2001-330840 | 11/2001 | JP | 2002-328381 | 11/2002 |
| JP | 2001-356353 | 12/2001 | JP | 2002-333628 | 11/2002 |
| JP | 2001-356354 | 12/2001 | JP | 2002-333635 | 11/2002 |
| JP | 2002-014360 | 1/2002 | JP | 2002-333843 | 11/2002 |
| JP | 2002-023176 | 1/2002 | JP | 2002-341329 | 11/2002 |
| JP | 2002-049045 | 2/2002 | JP | 2002-341355 | 11/2002 |
| JP | 2002-079160 | 3/2002 | JP | 2002-341356 | 11/2002 |
| JP | 2002-080321 | 3/2002 | JP | 2002-341357 | 11/2002 |
| JP | 2002-082340 | 3/2002 | JP | 2002-341358 | 11/2002 |
| JP | 2002-090759 | 3/2002 | JP | 2002-341359 | 11/2002 |
| JP | 2002-090760 | 3/2002 | JP | 2002-341362 | 11/2002 |
| JP | 2002-107740 | 4/2002 | KR | 1999-026577 | 4/1999 |
| JP | 2002-122870 | 4/2002 | KR | 2000-0020985 | 4/2000 |
| JP | 2002-122872 | 4/2002 | KR | 2000-0035302 | 6/2000 |
| JP | 2002-122873 | 4/2002 | | | |
| JP | 2002-131762 | 5/2002 | * cited by examiner | | |

APPARATUS FOR HARDENING A SEALANT LOCATED BETWEEN A PAIR BONDED SUBSTRATES OF LIQUID CRYSTAL DISPLAY DEVICE

This application claims the benefit of Korean Application Nos. P2002-014130 filed on Mar. 15, 2002, and P2002-014789 filed on Mar. 19, 2002, which are hereby incorporated by reference.

BACKGROUND OF THE INVENTION

1. Field of the Invention

The present invention relates to a liquid crystal display (LCD) device, and more particularly, to an apparatus for hardening sealant. Although the present invention is suitable for a wide scope of applications, it is particularly suitable for eliminating substrate defects in fabricating an LCD device.

2. Discussion of the Related Art

A thin flat panel display tends to have a thickness of no more than a few centimeters. Particularly, a liquid crystal display (LCD) has a wide scope of applications, such as notebook computers, computer monitors, gauge monitors for spacecrafts and aircrafts, and the like.

In general, the LCD is provided with a lower substrate having thin film transistors and pixel electrodes formed thereon, an upper substrate opposite to the lower substrate having a black matrix (BM), a color filter layer, and a common electrode, which are formed thereon, and a liquid crystal layer between the two substrates, for driving the liquid crystal by the electric field generated by the power supply applied to the pixel electrodes and the common electrode between the substrates, to regulate the transmittivity of the liquid crystal, thereby displaying a picture on the display screen.

In the foregoing LCD, a vacuum injection method and a liquid crystal dropping method have been used for forming a liquid crystal layer between the lower substrate and the upper substrate.

A method for fabricating a liquid crystal display using the vacuum injection method will now be explained.

A lower substrate and an upper substrate are prepared for the process. The lower substrate includes a thin film transistor and a pixel electrode. And, the upper substrate includes a black matrix, a color filter layer, and a common electrode.

In addition, a plurality of spacers are formed on either one of the substrates so as to maintain a uniform cell gap between the two substrates. The spacers are either formed of a plurality of ball spacers, which are spread on the substrate, or a plurality of column spacers, which are attached and fixed to the substrate.

A sealant preventing the liquid crystal from leaking and bonding the two substrates is deposited onto one of the substrates. Herein, a thermo-hardening sealant based on an epoxy resin is used as a sealant.

After attaching the two substrates, the thermo-hardening sealant is heated and hardened, thereby bonding the two substrates. Subsequently, the bonded substrates are placed inside a vacuum chamber. A space between the two substrates is maintained under a vacuum condition and immersed into a liquid crystal container, thereby forming a liquid crystal layer inside the bonded substrates.

However, with the advent of large-sized display screens, the method for fabricating a liquid crystal display using the vacuum injection method has become disadvantageous. More specifically, the time period for injecting the liquid crystal has become longer, thereby decreasing productivity.

A liquid crystal dropping method is used to resolve such problems caused by the vacuum injection method. The steps of preparing a lower substrate and an upper substrate, forming a plurality of spacers, and forming a sealant are the same as those in the vacuum injection method.

Subsequently, unlike the vacuum injection method whereby a liquid crystal is injected into the bonded substrates maintained at a vacuum state, a plurality of liquid crystal droplets are dispensed on the lower substrate where the sealant is formed. Then, the two substrates are bonded together.

In the liquid crystal dropping method, the droplets of liquid crystal are first dispensed on the lower substrate, the bonding of the two substrates is carried out thereafter. In this case, when a thermo-hardening sealant is used, the sealant may leak during the heating process and contaminate the liquid crystal. Therefore, in the liquid crystal dropping method, an ultra-violet (UV) hardening sealant based on an acrylic resin is used as the sealant.

Therefore, after attaching the two substrates, UV-rays are irradiated so as to bond the substrates. Also, when a UV hardening sealant partially including an epoxy resin is used, a heating process has to be further performed after irradiating the UV-rays, so as to completely harden the sealant.

The apparatus for hardening a sealant of the related art, more particularly, hardening a thermo-hardening sealant based on an epoxy resin in the vacuum injection method and the liquid crystal dropping method is shown in FIG. 1A.

FIG. 1A is a schematic perspective view of the related art apparatus for hardening a sealant. As shown in FIG. 1A, the related art apparatus for hardening a sealant includes a chamber 1, and a plurality of supporting bars 3 fixed on both inner sides of the chamber 1.

Bonded substrates each having a sealant are loaded upon the supporting bars 3. And, at least two supporting bars 3 form a step. A plurality of these steps are formed to load the substrates thereon.

The inside of the chamber 1 is heated by introducing heated air. The heated air is introduced through an introduction hole (not shown). In addition, a door (not shown) is formed on the side surface of the chamber 1, to which the supporting bars 3 are fixed. The door is opened when the bonded substrates are loaded upon and unloaded from the supporting bars, and closed when the heated air is introduced into the chamber 1.

A method for hardening a sealant using the apparatus for hardening a sealant having the above-described structure will be described. The door (not shown) on the chamber 1 is opened, so as to move bonded substrates by using a robot arm and to load the bonded substrates upon the supporting bars 3 inside the chamber 1. Then, the door is closed, and heated air is introduced into the chamber 1 so as to harden the sealant. Subsequently, the door is opened and the bonded substrates are unloaded.

FIG. 1B illustrates a perspective view showing the bonded substrate 5 being loaded upon the supporting bars 3 inside the chamber 1. FIG. 1C is a cross-sectional view taken along line IC-IC of FIG. 1B. As shown in FIGS. 1B and 1C, the supporting bars 3 of the related art apparatus for hardening a sealant has a round cross-section, thereby allowing the bonded substrate 5 and the supporting bars 3 to come into a linear contact.

Therefore, the region where the bonded substrate 5 coming into a linear contact with the supporting bars 3 is pressed by the heavy weight of the substrate, thereby pressing column spacers formed in the region. This pressing effect results in an image deficiency, whereby black spots are formed when the image is displayed on the screen.

In addition, when the bonded substrates 5 are heated at a high temperature during the hardening process of the sealant, the physical properties of the bonded substrates 5 may be altered. In this case, due to a small contact area between the supporting bars 3 and the bonded substrates 5, a region of the bonded substrates 5 between the supporting bars 3 may droop or sag, as shown in FIG. 1C.

SUMMARY OF THE INVENTION

Accordingly, the present invention is directed to an apparatus for hardening a sealant that substantially obviates one or more of problems due to limitations and disadvantages of the related art.

Another object of the present invention is to provide an apparatus for increasing a contact area between the bonded substrates and the supporting bars supporting the substrate, thereby eliminating a substrate defect during the process of hardening the sealant.

Another object of the present invention is to provide an apparatus for hardening a sealant that may resolve the problem of drooping or sagging of the substrate during the process of hardening the sealant, which is caused by an increase in the size of the bonded substrate.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for hardening a sealant on a substrate includes a chamber receiving at least a pair of bonded substrates, and at least one supporting unit supporting the bonded substrates, attached to inner side surfaces of the chamber, and having a substantially flat contact surface contacting the bonded substrates.

In another aspect of the present invention, an apparatus for hardening a sealant on a substrate includes a chamber receiving at least a pair of bonded substrates, a plurality of supporting bars, each supporting bar having a substantially flat first surface contacting the bonded substrates and a connecting member on each side of the supporting bars, and an attaching unit having one end attached to the chamber and another end attached to the connecting member of the supporting bars.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1A:
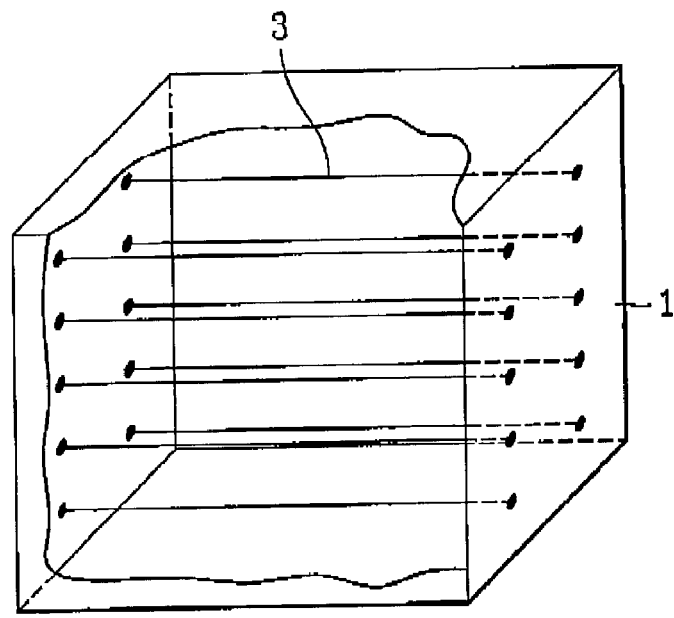
FIG. 1A is a schematic perspective view of the related art apparatus for hardening a sealant.
Figure 1B:
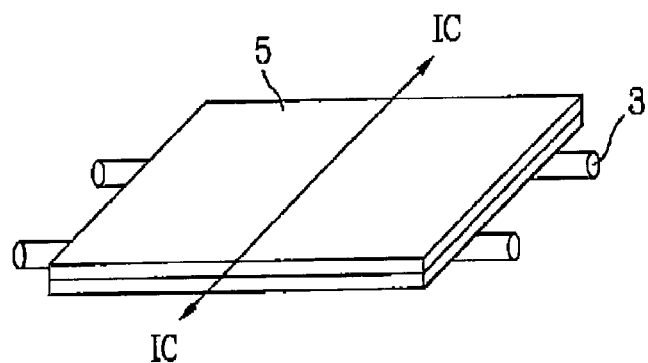
FIG. 1B is a perspective view illustrating that bonded substrates are loaded upon a pair of supporting bars inside a chamber.
Figure 1C:
FIG. 1C is a cross-sectional view taken along line IC-IC of FIG. 1B.
Figure 2:
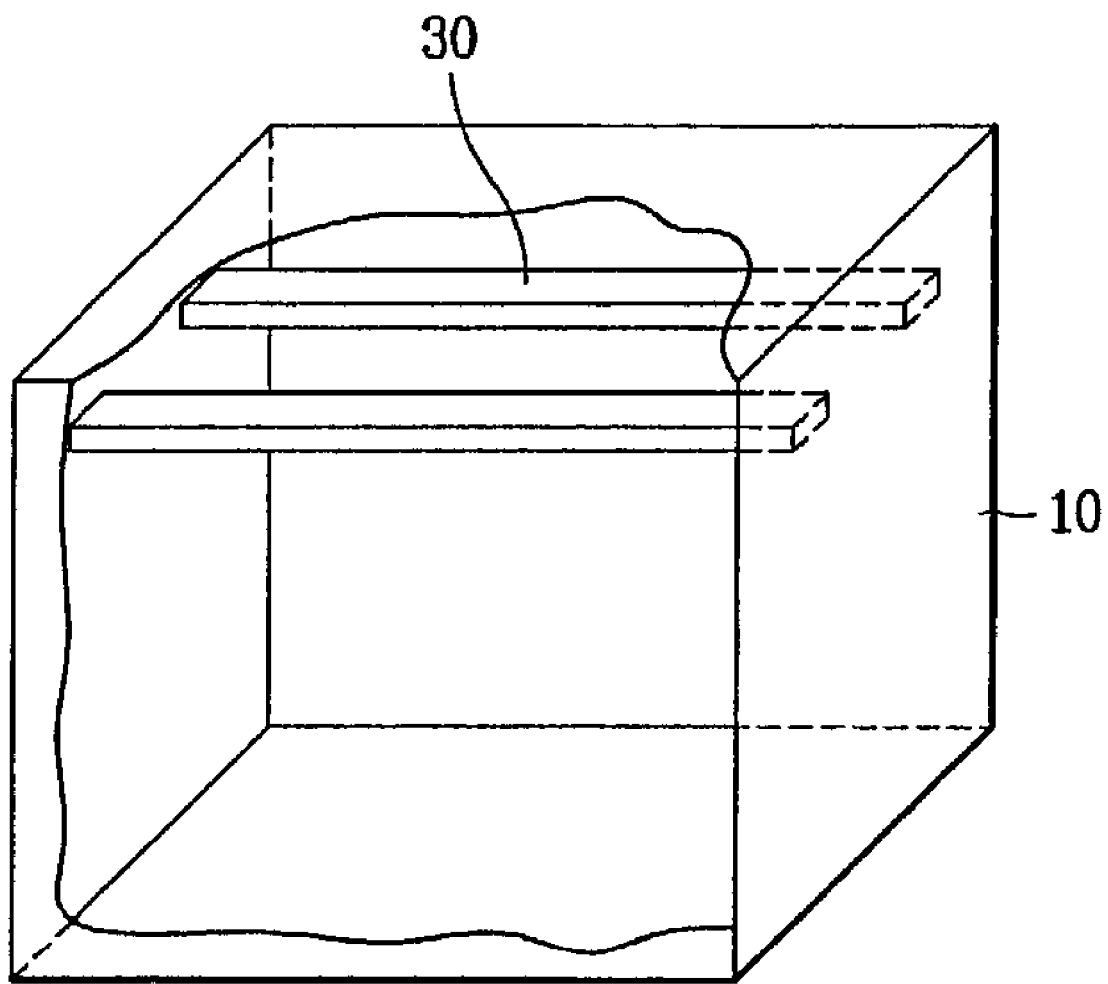
FIG. 2 is a schematic perspective view of an apparatus for hardening a sealant according to a first embodiment of the present invention.

FIG. 2 is a schematic perspective view of an apparatus for hardening a sealant according to a first embodiment of the present invention. As shown in FIG. 2, the apparatus for hardening a sealant according to the first embodiment of the present invention includes a chamber 10, and a plurality of straight supporting bars 30 attached to the inner sides of the chamber 10.

FIG. 2 illustrates that two straight supporting bars 30 form a step. However, the step may also be formed of three straight supporting bars. Herein, the location of each straight supporting bar 30 may be controlled so as to provide enough space for a robot arm, which loads and unloads the bonded substrates. For example, only a single step is illustrated in FIG. 2. However, a plurality of steps may be arranged in parallel so that a plurality of the bonded substrates may be loaded and unloaded.

The inside of the chamber 10 is heated by introducing heated air. Therefore, an introduction hole (not shown) is formed to allow the heated air to flow into the chamber 10. In addition, a door (not shown) is formed in the chamber 10. The door is opened when the bonded substrates are loaded upon and unloaded from the supporting bars, and closed when the heated air is introduced into the chamber 10.

Figure 3A:
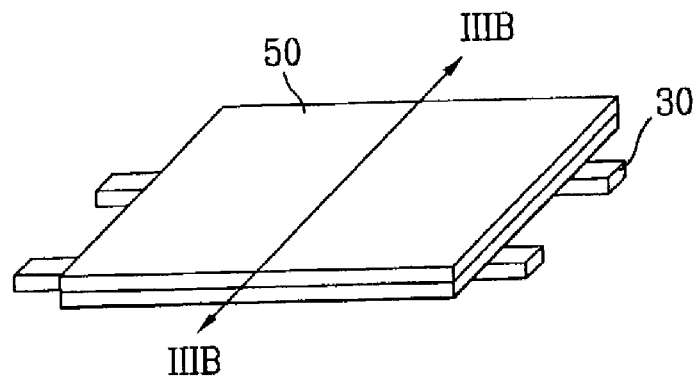
FIG. 3A illustrates a perspective view of the bonded substrates loaded upon a pair of supporting bars of FIG. 2.
Figure 3B:
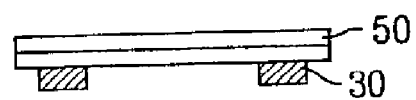
FIG. 3B is a cross-sectional view taken along line IIIB-IIIB of FIG. 3A.

FIG. 3A illustrates a perspective view of bonded substrates loaded upon a pair of supporting bars of FIG. 2. FIG. 3B is a cross-sectional view taken along line IIIB-IIIB of FIG. 3A.

As shown in FIGS. 3A and 3B, the supporting bars 30 of the apparatus for hardening a sealant according to the first embodiment of the present invention, has a rectangular cross-section (i.e., a flat surface). Thus, the bonded substrates 50 and the supporting bars 30 have a broad contact area.

Therefore, the weight of the bonded substrates 50 is not concentrated on one specific area but is evenly spread, thereby preventing the bonded substrates 50 from bending down when heated. Specific areas, such as column spacers, are not locally pressed. Thus, black spots do not appear on a displaying image.

Figure 4:
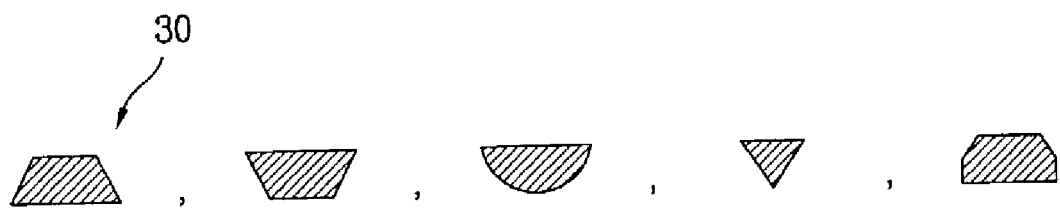
FIG. 4 illustrates a cross-sectional view showing variations of a supporting unit according to the present invention.

FIG. 4 illustrates a cross-sectional view showing variations of a supporting unit according to the present invention.

The straight supporting bar 30 should have a flat upper surface. More specifically, a contact area with the bonded substrates and the supporting bars should have a flat surface. Therefore, the upper surface of the straight supporting bar 30 may have any quadrilateral shapes, such as a rectangle, a square, or a trapezoid, a half-circular shape, an inverted triangular shape, or any polygonal shape having a flat upper surface.

However, a plurality of supporting bars 30 are arranged in a parallel structure, thereby forming a plurality of steps. In addition, since a plurality of the bonded substrates are loaded upon and unloaded from the steps, the lower surfaces of each supporting bar 30 should also be flat.

Figure 5:
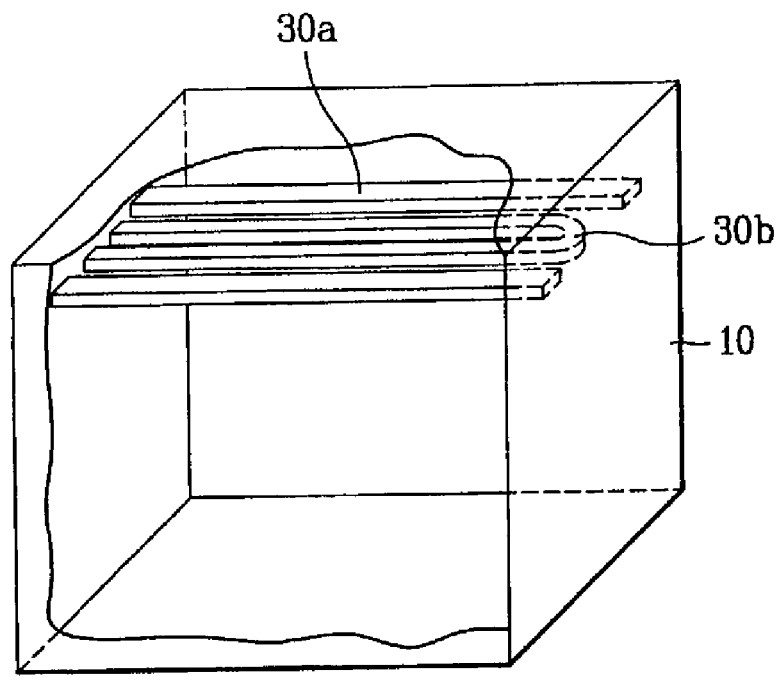
FIG. 5 illustrates a schematic perspective view of the apparatus for hardening a sealant according to a second embodiment of the present invention.

FIG. 5 illustrates a schematic perspective view of the apparatus for hardening a sealant according to a second embodiment of the present invention. As shown in FIG. 5, the apparatus for hardening a sealant according to the second embodiment of the present invention includes a chamber 10, a plurality of straight supporting bars 30*a* attached to inner sides of the chamber 10, and a "U" shaped supplementary supporting member 30*b* attached to one of inner sides of the chamber 10.

By forming the supporting unit for supporting the bonded substrates with a plurality of straight supporting bars 30*a* and the "U" shaped supplementary supporting member 30*b*, the bonded substrates may be held with more stability.

Herein, a robot arm (not shown) is placed in a gap formed between the straight supporting bars 30*a* and the "U" shaped supplementary supporting member 30*b*, so as to carry out the process of loading and unloading the bonded substrates.

Since each of the straight supporting bars 30*a* and the "U" shaped supplementary supporting member 30*b* have a flat upper surface, the surface that comes into contact with the substrate may have any quadrilateral shapes, such as a rectangle, a square, or a trapezoid, a half-circular shape, an inverted triangular shape, or any polygonal shape having a flat upper surface.

Some other parts of the apparatus are the same as those of the first embodiment, detailed descriptions are omitted for simplicity.

Figure 6:
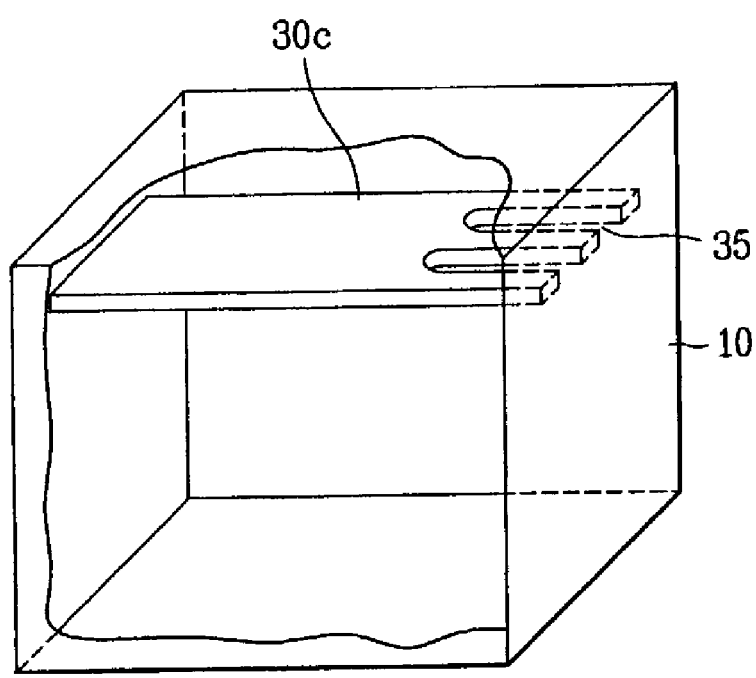
FIG. 6 illustrates a schematic perspective view of the apparatus for hardening a sealant according to a third embodiment of the present invention.

FIG. 6 illustrates a schematic perspective view of the apparatus for hardening a sealant according to a third embodiment of the present invention. As shown in FIG. 6, the apparatus for hardening a sealant according to the third embodiment of the present invention includes a chamber 10, and a flat supporting member 30*c* having a plurality of grooves 35 and attached inside the chamber 10.

More specifically, by forming the supporting unit for supporting the bonded substrates with a flat supporting member 30*c*, problems of bending in the bonded substrates and a partial pressing effect may be prevented.

Herein, one side of the flat supporting member 30*c* is formed of a plurality of grooves 35. A robotic arm (not shown) is placed therein, so as to carry out the processes of loading and unloading the bonded substrates.

The cross-section of the flat supporting member 30*c* may have any quadrilateral shapes, such as a rectangle, a square, or a trapezoid, a half-circular shape, an inverted triangular shape, or any polygonal shape having a flat upper surface.

Since other parts of the apparatus are the same as those of the previously described embodiments of the present invention, detailed descriptions are omitted for simplicity.

Figure 7:
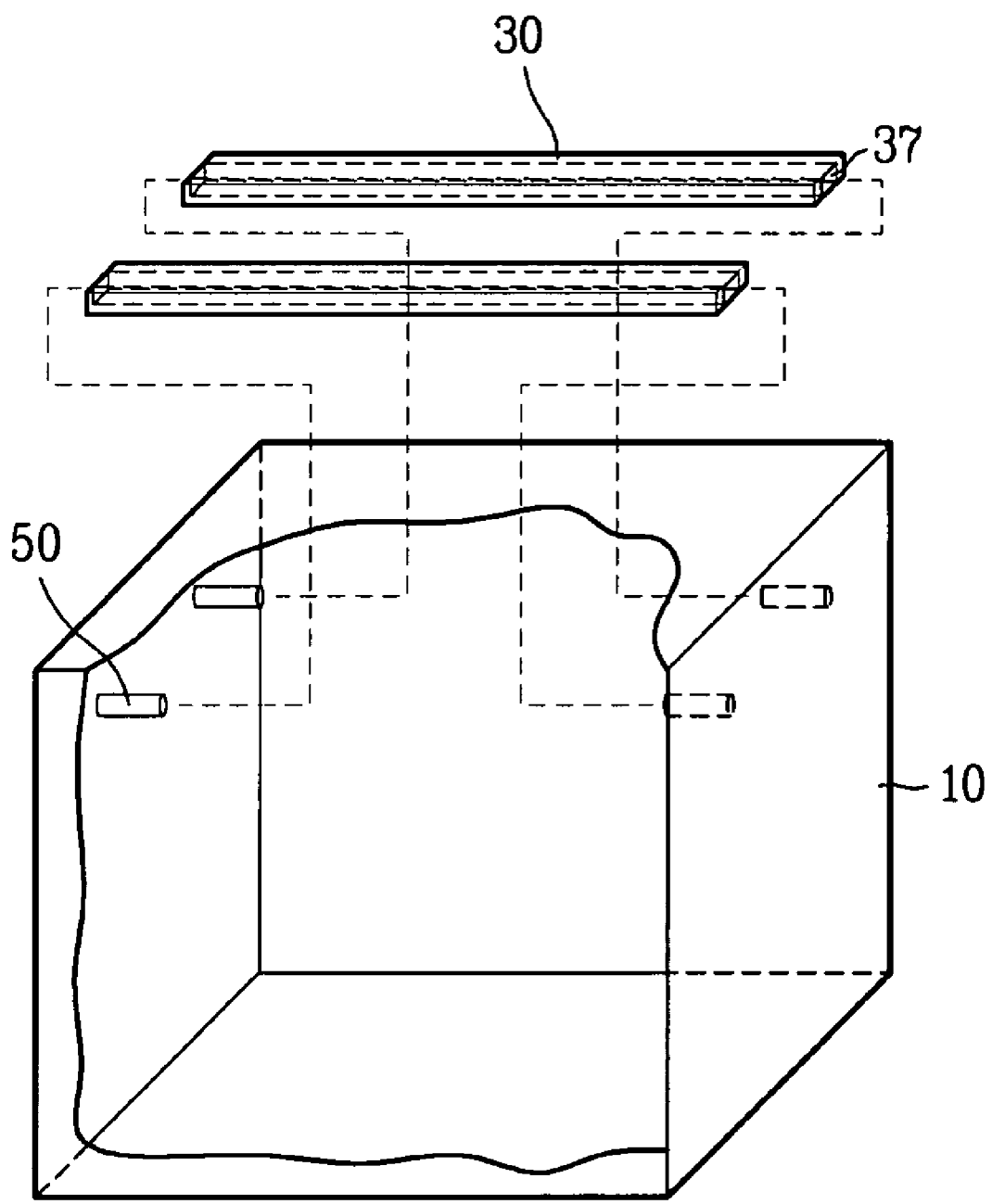
FIG. 7 illustrates a schematic perspective view of the apparatus for hardening a sealant according to a fourth embodiment of the present invention.

FIG. 7 illustrates a schematic perspective view of the apparatus for hardening a sealant according to a fourth embodiment of the present invention. As shown in FIG. 7, the apparatus for hardening a sealant according to the fourth embodiment of the present invention includes a chamber 10, a plurality of supporting bars 30, and an attaching unit 50 attaching the supporting bars 30 inside the chamber 10.

FIG. 7 illustrates that two straight supporting bars 30 form a step. However, the step may also be formed of three straight supporting bars. Herein, the location of each straight supporting bar 30 and the number of supporting bars 30 are controlled so as to provide enough space for a robot arm, which loads and unloads the bonded substrates. For example, only a single step is illustrated in FIG. 7. However, a plurality of steps may be arranged in parallel so that a plurality of the bonded substrates may be loaded and unloaded.

Herein, each of the supporting bars 30 is formed of a flat upper surface. A hole 37 may be formed to have the same length as that of the attaching unit 50, which is inserted therein. Alternatively, the hole 37 may also be formed to pass through the entire supporting bar 30*a*.

The side surface of the attaching unit 50 is round. One end of the attaching unit 50 is attached to the chamber 10, and another end is attached to the hole 37 of the supporting bar 30. Therefore, the attaching unit 50 attaches the supporting bar 30 into the chamber 10. Also, due to the round cross-section of the attaching unit 50, the supporting bar 30 may be tilted to the left or to the right.

The inside of the chamber 10 is heated by introducing heated air. Thus, an introduction hole (not shown) may formed to allow the heated air to flow into the chamber 10. In addition, a door (not shown) may be formed on the side surface of the chamber 10, where the supporting bars 30 are placed. The door is opened when the bonded substrates are loaded upon and unloaded from the supporting bars 30, and closed when the heated air is introduced into the chamber 10.

Figure 8A:
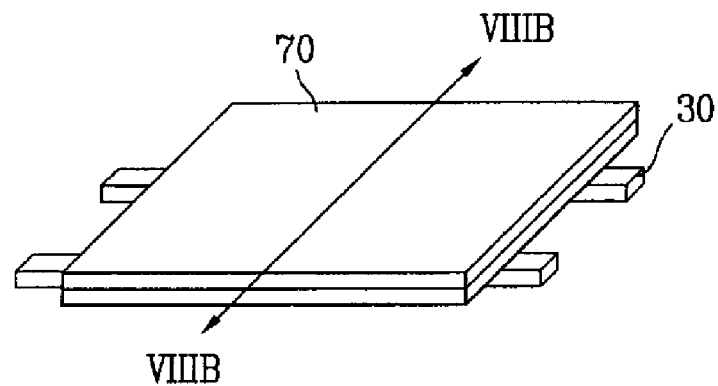
FIG. 8A illustrates a perspective view of the bonded substrates loaded upon a pair of supporting bars of FIG. 7.
Figure 8B:
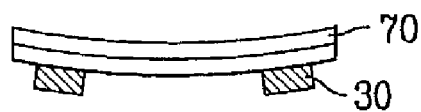
FIG. 8B illustrates a cross-sectional view taken along line VIIIB-VIIIB of FIG. 8A.

FIG. 8A illustrates a perspective view of bonded substrates loaded upon a pair of supporting bars of FIG. 7. FIG. 8B illustrates a cross-sectional view taken along line VIIIB-VIIIB of FIG. 8A.

As shown in FIGS. 8A and 8B, the supporting bars 30 of the apparatus for hardening a sealant according to the fourth embodiment of the present invention, has a flat upper surface. Thus, the bonded substrates 50 and the supporting bars 30 have a broad contact area.

Therefore, the weight of the bonded substrates is not concentrated on one specific area but is evenly spread. Also, a specific area, such as a column spacer is not locally pressed. Thus, black spots may not appear on a displaying image.

In addition, due to a large size of the bonded substrates 70, a region of the bonded substrates 70 between supporting bars 30 may be bent down. However, as shown in FIG. 8B, the supporting bars 30 may be tilted to the direction of the drooping or sagging of the bonded substrates 70, thereby preventing a local pressing effect on the substrate.

Figure 9:
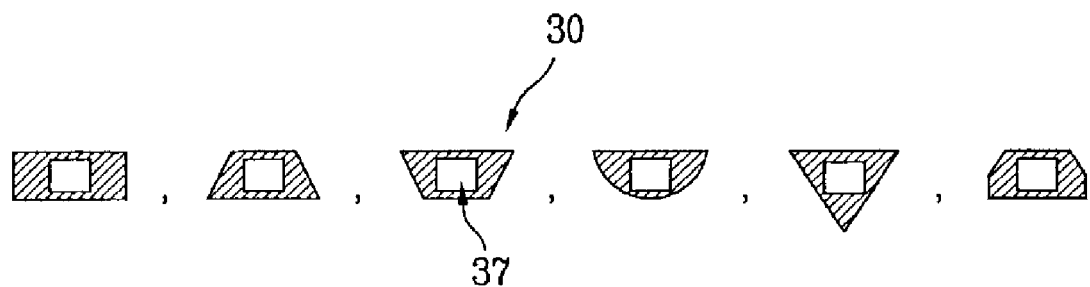
FIG. 9 illustrates a cross-sectional view showing variations of a supporting unit according to the fourth embodiment of the present invention.

FIG. 9 illustrates a cross-sectional view showing variations of a supporting bar 30 according to the fourth embodiment of the present invention. More specifically, FIG. 9 is a cross-sectional view of a region of the supporting bar 30 where a hole 37 is formed.

The upper surface of the supporting bar 30, which comes into contact with the bonded substrates should be flat. A cross-section of the supporting bar 30 may have any quadrilateral shapes, such as a rectangle, a square, or a trapezoid, a half-circular shape, an inverted triangular shape, or any polygonal shape having a flat upper surface.

However, a plurality of the supporting bars 30 are placed in a parallel structure, thereby forming a plurality of steps. In addition, since a plurality of the bonded substrates are loaded upon and unloaded from the steps, the lower surfaces of each support bar 30 may also be flat.

In addition, the hole 37 formed in each of the supporting bars 30 allows the supporting bar 30 to be tilted in accordance with the cross-section of the attaching unit 50. Thus, the drooping or sagging problem of the bonded substrates may be solved.

Therefore, the hole 37 should be larger than the attaching unit 50 inserted therein. A cross-section of the hole 37 may be formed of various shapes, such as quadrilateral and round shapes. However, the quadrilateral shape may be more efficient to solve the bending problem of the bonded substrates.

When fabricating a liquid crystal display by using the vacuum injection method, the apparatus for hardening a sealant according to the present invention may be used to harden a thermo-hardening sealant, such as an epoxy resin. Also, when fabricating a liquid crystal display by using the liquid crystal dropping method, the apparatus for hardening a sealant according to the present invention may be used to harden a UV-hardening sealant, such as an acrylic resin partially including an epoxy resin.

The upper surface of each supporting bar, which is attached inside the chamber of the present invention having the above-described structure, is formed of a flat surface. The flat upper surface of the supporting bars increase the contact area between the bonded substrates and the supporting unit, thereby preventing the bonded substrates from drooping or sagging when heated. Also, black spots caused by pressure locally applied to the bonded substrate may be prevented.

In addition, the supporting bars are movably fixed inside the chamber of the present invention by using a round attaching unit, which allows the supporting bars to be tilted in accordance with the bending of the bonded substrates, thereby preventing a defect in the bonded substrates caused by a local pressing effect of the supporting bars.

It will be apparent to those skilled in the art that various modifications and variations can be made in the apparatus for hardening a sealant of the present invention without departing from the spirit or scope of the inventions. Thus, it is intended that the present invention covers the modifications and variations of this invention provided they come within the scope of the appended claims and their equivalents.

What is claimed is:

1. An apparatus for hardening a sealant located between a pair of bonded substrates of a liquid crystal display device comprising:
    a chamber receiving at least the pair of bonded substrates of the liquid crystal display device;
    an introduction hole introducing heated air into the chamber, wherein an inside of the chamber is heated by the introducing heated air;
    a plurality of supporting bars inside the chamber, each supporting bar having a substantially flat first surface contacting the bonded substrates and having long sides and at least one short side, and a connecting member at the at least one short side of the supporting bars, the long sides of the supporting bar being separated from an inner side surface of the chamber; and
    an attaching unit having one end attached to the chamber and another end attached the connecting member of the supporting bars,
    wherein the connecting member is a hole,
    wherein the hole has a quadrilateral cross-section and the attaching unit has a round cross-section; and
    wherein the hole is larger than the attaching unit inserted therein in order that the supporting bars are tilted in accordance with the round cross-section of the attaching unit.

2. The apparatus according to claim 1, wherein the connecting member has a length corresponding to that of the attaching unit.

3. The apparatus according to claim 1, wherein the supporting bars have a substantially flat second surface facing into other bonded substrates.

4. The apparatus according to claim 1, wherein the supporting bars form a plurality of steps.

5. The apparatus according to claim 1, wherein the supporting bars have a quadrilateral cross-section.

6. An apparatus for hardening a sealant located between a pair of bonded substrates of a liquid crystal display device comprising:
    a chamber receiving at least the pair of bonded substrates of the liquid crystal display device;
    an introduction hole introducing heated air into the chamber, wherein an inside of the chamber is heated by the introducing heated air;
    a plurality of supporting bars inside the chamber, each supporting bar having a substantially flat first surface contacting the bonded substrates and a connecting member on each side of the supporting bars; and
    an attaching unit having one end attached to the chamber and another end attached the connecting member of the supporting bars, wherein the connecting member includes an empty space inside the connecting member and passes through an entire supporting bar,
    wherein the empty space has a quadrilateral cross-section and the attaching unit has a round cross-section; and
    wherein the empty space is larger than the attaching unit inserted therein in order that the supporting bars are tilted in accordance with the round cross-section of the attaching unit.

7. The apparatus according to claim 6, wherein the supporting bars have a substantially flat second surface facing into other bonded substrates.

8. The apparatus according to claim 6, wherein the supporting bars form a plurality of steps.

9. The apparatus according to claim 6, wherein the supporting bars have a quadrilateral cross-section.

* * * * *